(12) United States Patent
Tadros et al.

(10) Patent No.: US 7,087,682 B2
(45) Date of Patent: Aug. 8, 2006

(54) POLYMERIC BLENDS FOR OPTICAL DEVICES AND METHOD OF MANUFACTURE THEREOF

(75) Inventors: Safwat Tadros, Evansville, IN (US); Parminder Agarwal, Evansville, IN (US); Shreyas Chakravarti, Evansville, IN (US); Peter Vollenberg, Evansville, IN (US)

(73) Assignee: General Electric, Pittsfield, MA (US)

( * ) Notice: Subject to any disclaimer, the term of this patent is extended or adjusted under 35 U.S.C. 154(b) by 0 days.

(21) Appl. No.: 10/832,850

(22) Filed: Apr. 27, 2004

(65) Prior Publication Data

US 2004/0220333 A1   Nov. 4, 2004

Related U.S. Application Data

(60) Provisional application No. 60/467,630, filed on May 2, 2003, provisional application No. 60/524,790, filed on Nov. 25, 2003.

(51) Int. Cl.
*C08F 20/00* (2006.01)

(52) U.S. Cl. .................. 525/437; 264/176.1; 264/219; 359/642; 369/47; 369/59.11; 428/411.1; 428/412

(58) Field of Classification Search ............. 264/176.1, 264/219; 359/642; 369/47, 59.11; 428/411.1, 428/412; 525/437

See application file for complete search history.

(56) References Cited

U.S. PATENT DOCUMENTS

| | | | |
|---|---|---|---|
| 2,465,319 A | 3/1949 | Whinfield et al. |
| 2,999,835 A | 9/1961 | Goldberg et al. |
| 3,038,365 A | 6/1962 | Peterson |
| 3,047,539 A | 7/1962 | Pengilly |
| 3,153,008 A | 10/1964 | Fox |
| 3,334,154 A | 8/1967 | Kim |
| 3,864,428 A | 2/1975 | Nakamura et al. |
| 4,001,184 A | 1/1977 | Scott |
| 4,123,436 A | 10/1978 | Holub et al. |
| 4,131,575 A | 12/1978 | Adelmann et al. |
| 4,188,314 A | 2/1980 | Fox et al. |

(Continued)

FOREIGN PATENT DOCUMENTS

EP    0 442 861 A2   2/1991

(Continued)

OTHER PUBLICATIONS

Japanese Abstract for JP 07-224218 A Publication date Aug. 22, 1995.

(Continued)

*Primary Examiner*—Terressa Boykin

(57) ABSTRACT

A method for manufacturing a film or sheet comprises deforming a polymeric alloy at a temperature effective to impart to the deformed alloy a birefringence retardation of greater than or equal to about 350 nanometers. A method of substantially eliminating comets and veins in an optical film or sheet comprises annealing the film or sheet comprising a polymeric alloy to a temperature proximate to a glass transition temperature of a polymeric resin contained in the alloy. A composition comprises a first polymeric resin in an amount of about 1 to about 99 wt %; and a second polymeric resin in an amount of about 1 to about 99 wt %, wherein the polymeric resins are treated with a deforming force or with an energy effective to produce a polymeric alloy having a birefringence retardation of greater than or equal to about 350 nanometers or with a birefringence retardation of less than or equal to about 150 nanometers.

48 Claims, 3 Drawing Sheets

U.S. PATENT DOCUMENTS

| | | | |
|---|---|---|---|
| 4,264,487 A | 4/1981 | Fromuth et al. | |
| 4,610,833 A | 9/1986 | Kanesaki et al. | |
| 4,778,656 A | 10/1988 | Allen et al. | |
| 4,786,692 A | 11/1988 | Allen et al. | |
| 4,879,355 A | 11/1989 | Light et al. | |
| 4,992,218 A | 2/1991 | Sugio et al. | |
| 5,017,659 A | 5/1991 | van der Groep | |
| 5,026,817 A | 6/1991 | Sakashita et al. | |
| 5,180,595 A * | 1/1993 | Kinoshita | 425/556 |
| 5,194,523 A | 3/1993 | Small, Jr. et al. | |
| 5,214,072 A | 5/1993 | Fennhoff et al. | |
| 5,230,753 A * | 7/1993 | Wagner | 148/403 |
| 5,399,661 A | 3/1995 | Borman | |
| 5,486,562 A | 1/1996 | Borman et al. | |
| 5,502,153 A | 3/1996 | Sakashita et al. | |
| 5,800,744 A | 9/1998 | Munakata | |
| 5,827,614 A | 10/1998 | Bhalakia et al. | |
| 5,942,585 A | 8/1999 | Scott et al. | |
| 6,005,059 A | 12/1999 | Scott et al. | |
| 6,011,124 A | 1/2000 | Scott et al. | |
| 6,037,424 A | 3/2000 | Scott et al. | |
| 6,043,322 A | 3/2000 | Scott et al. | |
| 6,117,384 A | 9/2000 | Laurin et al. | |
| 6,136,441 A | 10/2000 | MacGregor et al. | |
| 6,217,995 B1 | 4/2001 | Handa | |
| 6,270,698 B1 | 8/2001 | Pope | |
| 6,367,930 B1 | 4/2002 | Santelices et al. | |
| 6,458,913 B1 | 10/2002 | Honigfort et al. | |
| 6,773,649 B1 * | 8/2004 | Bourne et al. | 264/210.2 |
| 6,812,264 B1 | 11/2004 | Sunagawa et al. | |
| 2001/0044003 A1 | 11/2001 | Gallucci et al. | |
| 2002/0035207 A1 | 3/2002 | Hariharan et al. | |
| 2002/0082360 A1 | 6/2002 | Conn et al. | |
| 2003/0170564 A1 * | 9/2003 | Kido et al. | 430/270.11 |

FOREIGN PATENT DOCUMENTS

| | | |
|---|---|---|
| EP | 0 546 748 A1 | 12/1992 |
| EP | 0 596 129 A1 | 2/1993 |
| EP | 0 737 716 A2 | 10/1996 |
| GB | 1 559 230 | 10/1977 |
| WO | WO 99/63002 | 12/1999 |
| WO | WO 01/92419 A2 | 12/2001 |

OTHER PUBLICATIONS

Raymond J. Kray et al., "Thermally Stable Polyimides with 400°F Processability" 29th Annual Technical Conference, 1974, Reinforced Plastics/Composites Institute, The Society of the Plastics Industry, Inc., pp. 1-10.

Z. Mei et al., "Modified EVA Encapsulant Formulations for Low Temperature Processing" Proceedings—NCPV Program Review Meeting Lakewood, Colorado, Oct. 14-17 (2001) pp. 317-318.

A. J. Hill et al. "A Free Volume Approach to the Mechanical Behaviour of Miscible Polycarbonate Blends" J. Phys.: Condens. Matter, 8, 3811-3827 (1996).

Gary M. Stack et al. "Dynamic Mechanical and Dielectric Relaxation Study of Aliphatic Polyester Based Blends" J. M. Polym. Mater. Sci. Eng. (1993), 69, 4-5, Eastman Chemical Company, Kingsport, TN 37662.

Hill et al. "A free volume approach to the mechanical behaviour [sic] of miscible polycarbonate blends", Journal of Physics: Condensed Matter, vol. 8, 1996 pp. 3811-3827.

International Search Report for PCT/US2004/013438 International Filing Date Apr. 30, 2004.

* cited by examiner

POLYMERIC BLENDS FOR OPTICAL DEVICES AND METHOD OF MANUFACTURE THEREOF

CROSS REFERENCE TO RELATED APPLICATIONS

This application claims the benefit of U.S. Provisional Application Ser. No. 60/467,630 filed May 2, 2003 and U.S. Provisional Application Ser. No. 60/524,790, filed Nov. 25, 2003.

BACKGROUND

This disclosure relates to polymeric blends for optical devices and method of manufacture thereof.

High optical quality devices such as films and sheets are generally sought to be utilized in many applications such as optical elements, ophthalmic lenses, and the like. These optical devices generally utilize additional functional properties such as light polarization, photo-chromism, tint, color, decor, indicia, hardness, anti-abrasion, anti fog, X-ray recording capabilities, photographic film capabilities, digital storage capabilities, light management capabilities, and the like. It is generally desirable to use polymeric alloys for these applications, where certain specific functionality can be economically and cost effectively met. Polymeric alloys however, generally suffer from drawbacks such as the presence of comets and veins and veins, which render the film inadequate for such high quality optical applications. It is therefore generally desirable to develop polymeric alloy compositions, which can be effectively utilized in optical devices. It is additionally desirable to develop methods for processing polymeric alloys into optical films and lenses wherein such defects are substantially reduced or eliminated.

BRIEF SUMMARY

A method for manufacturing a film or sheet comprises deforming a polymeric alloy at a temperature effective to impart to the deformed alloy a birefringence retardation of greater than or equal to about 350 nanometers.

In another embodiment, a method of substantially eliminating comets and veins in an optical film or sheet comprises annealing the film or sheet comprising a polymeric alloy to a temperature proximate to a glass transition temperature of a polymeric resin contained in the alloy.

In yet another embodiment, a composition comprises a first polymeric resin in an amount of about 1 to about 99 wt %; and a second polymeric resin in an amount of about 1 to about 99 wt %, wherein the polymeric resins are treated with a deforming force or with an energy effective to produce a polymeric alloy having a birefringence retardation of greater than or equal to about 350 nanometers or with a birefringence retardation of less than or equal to about 150 nanometers.

In yet another embodiment, an optical device is manufactured by a method comprising deforming a polymeric alloy at a temperature effective to impart to the deformed alloy a birefringence retardation of greater than or equal to about 350 nanometers or by annealing a polymeric alloy at a temperature effective to impart to the deformed alloy a birefringence retardation of less than or equal to about 150 nanometers

DETAILED DESCRIPTION OF PREFERRED EMBODIMENTS

Disclosed herein are compositions comprising polymeric alloys that have a transmissivity of greater than or equal to about 85% and which are substantially free of defects such as comets and veins when examined in polarizing light in the visible spectrum of light i.e. wavelengths of about 300 nanometers (nm) to about 1000 nm. Disclosed herein is a method for producing optical films and optical lenses from polymeric alloys that have reduced numbers of defects such as comets and veins or that are substantially free of such defects. Disclosed herein too, is a method for reducing or eliminating defects such as comets and veins present in an optical device comprising an optical film or sheet manufactured from polymeric alloys.

These compositions advantageously permit the use of films of thicknesses of greater than or equal to about 5 micrometers (0.2 mils) to less than or equal to about 1000 micrometers (40 mils). In another exemplary embodiment, these polymeric alloys may be manufactured into sheet having thickness greater than or equal to about 1001 micrometers (40.04 mils) to a thickness of less than or equal to about 40,000 micrometers (1600 mils). Disclosed herein too is a polymeric alloy composition and a method for employing the polymeric alloy in the form of an optical film on a substrate, wherein the substrate has minimal thermal resistance, and wherein the film can be applied to the substrate without any substantial damage or degradation. Disclosed herein too is a polymeric alloy composition and a method for employing the polymeric alloy in the form of an optical film on a substrate, wherein the substrate is applied to the film by a back molding process, and wherein the film does not undergo substantial distortion or degradation during the back molding process. Back molding is sometimes referred to as over-molding. In one embodiment, a sheet or film that has first been deformed, may be subsequently annealed at a temperature effective to impart to the sheet a birefringence retardation of less than or equal to about 150 nm. In another embodiment, a sheet that has first been annealed may subsequently be deformed at a temperature effective to impart to the sheet a birefringence retardation of greater than or equal to about 350 nm.

Figure 1:
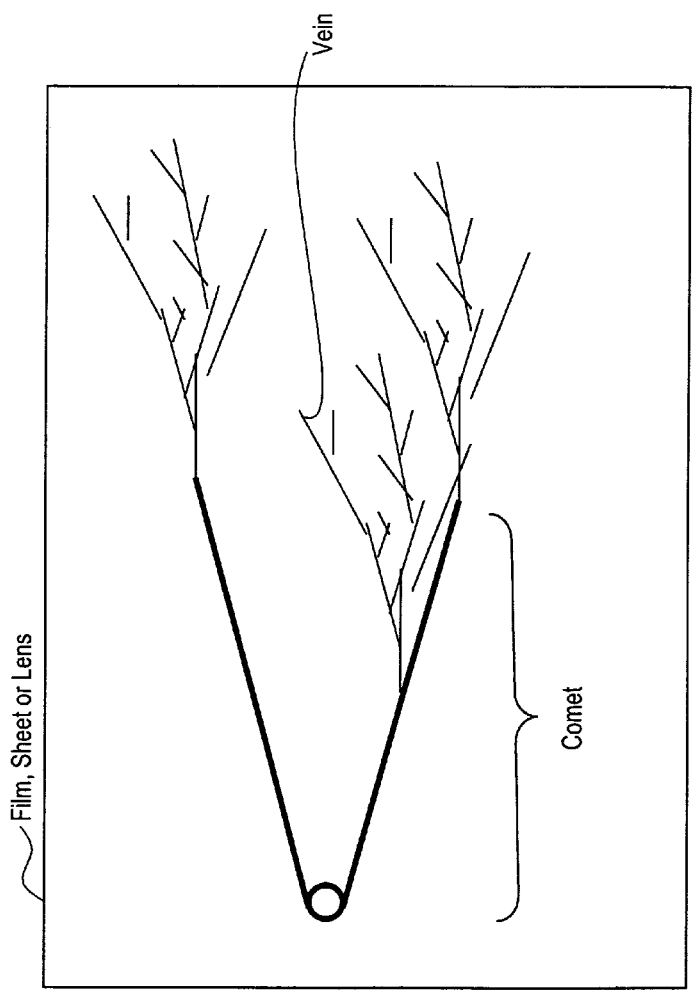
FIG. 1 is a schematic representation of a polymeric film or sheet having comets and veins.

As defined herein, a comet is a defect generally formed around an inhomogeneity within the polymeric resin used in the film or sheet, when subjected to polarized visible light. A schematic depiction of both comets and veins may be seen in FIG. 1. As may be seen in the figure, the comet is the defect generally formed around inhomogeneities such as crystallites induced by stress deformation of the polymeric resin, nucleating agents, micro-bubbles, degradation, impurities such as black specs, fillers, and the like. Comets may also form around crystallites that remain unmelted during the processing of the polymeric resin. Comets may also form around crystallites that are formed during the processing of the polymeric resin. As may be seen in the figure, veins are fibrillar type defects that generally have a branch like or tree like appearance and generally appear within the tail of the comet. Without being limited by theory, it is believed that the formation of comets and veins are promoted by local variations in melt morphology (during the formation of sheets and films) due to factors such as phase separation, alloying inhomogeneities, and the like. These defects generally render the film or sheet unusable for high quality optical applications.

Polymeric alloys used for such high quality optical devices, are generally blends of thermoplastic polymeric resins. Thermoplastic polymeric resins that may be used in the optical devices can be oligomers, polymers, ionomers, dendrimers, copolymers such as block copolymers, graft copolymers, star block copolymers, random copolymers, or the like, or combinations comprising at least one of the foregoing thermoplastic polymeric resins. Suitable examples of thermoplastic polymeric resins are polyolefins such as polyethylene, polypropylene; polyamides such as Nylon 4,6, Nylon 6, Nylon 6,6, Nylon 6, 10, Nylon 6, 12; polyesters such as polyethelene terephthalate (PET), polybutylene terephthalate (PBT), poly(1,4-cyclohexane-dimethanol-1,4-cyclohexanedicarboxylate) (PCCD), poly(trimethylene terephthalate) (PTT), poly(cyclohexanedimethanol-co-ethylene glycol terephthalate) (PETG or PCTG), poly(ethylene naphthalate) (PEN), poly(butylene naphthalate) (PBN); polyimides, polyacetals, polyacrylics, polycarbonates (PC), polystyrenes, polyanide-imides, polyarylates, polyacrylates, polymethacrylates such as polymethylmethacrylate (PMMA), polyurethanes, polyarylsulfones, polyethersulfones, polyarylene sulfides, polyvinyl chlorides, polysulfones, polyetherimides, polytetrafluoroethylenes, polyetherketones, polyether etherketones, polyarylene ethers, liquid crystalline polymers, or the like, or combinations comprising at least one of the foregoing polymeric resins.

Blends of polyesters such as a blend comprising the copolymer of 100 mole percent terephthalic acid, about 1 to about 99 mole percent 1,4-cyclohexanedimethanol and about 1 to about 99 mole percent ethylene glycol (entire copolymer denoted as PCTG), wherein the 1,4-cyclohexanedimethanol comprises a 70:30 mole ratio of trans to cis isomers, may be used in the alloy. One commercially available PCTG is EASTAR™ PCTG Copolyester 5445™, which is available from the Eastman Chemical company. Polyester-carbonates (also known as copolyester-polycarbonates) (PPC) may also be used in the polymeric alloys. Amorphous polyamides such as Trogamid commercially available from Degussa Chemicals may also be used in the polymeric alloys. Another blend that may be advantageously used is a blend comprising a copolymer of 100 mole percent cyclohexane dimethanol, 1 to 100 mole percent terephthalic acid and 1 to 100 mole percent isophthalic acid.

Preferred polymeric alloys are PC-PCCD, PC-PETG, PC-PET, PC-PBT, PC-PCT, PC-PCTG, PC-PPC, PC-PCCD-PETG, PC-PCCD-PCT, PC-PPC-PCTG, PC-PCTG-PETG, polyphenylene ether-polyamide, polyphenylene ether polystyrene, and the like.

A preferred polymeric blend is a polycarbonate-cycloaliphatic polyester blend. As used herein, the terms "polycarbonate", "polycarbonate composition", and "composition comprising aromatic carbonate chain units" includes compositions having structural units of the formula (I):

in which greater than or equal to about 60 percent of the total number of $R^1$ groups are aromatic organic radicals and the balance thereof are aliphatic, alicyclic, or aromatic radicals. Preferably, $R^1$ is an aromatic organic radical and, more preferably, a radical of the formula (II):

wherein each of $A^1$ and $A^2$ is a monocyclic divalent aryl radical and $Y^1$ is a bridging radical having zero, one, or two atoms which separate $A^1$ from $A^2$. In an exemplary embodiment, one atom separates $A^1$ from $A^2$. Illustrative, examples of radicals of this type are —O—, —S—, —S(O)—, —S(O$_2$)—, —C(O)—, methylene, cyclohexyl-methylene, 2-[2,2,1]-bicycloheptylidene, ethylidene, isopropylidene, neopentylidene, cyclohexylidene, cyclopentadecylidene, cyclododecylidene, adamantylidene, and the like. In another embodiment, zero atoms separate $A^1$ from $A^2$, with an illustrative example being bisphenol (OH-benzene-benzene-OH). The bridging radical $Y^1$ can be a hydrocarbon group or a saturated hydrocarbon group such as methylene, cyclohexylidene or isopropylidene.

Polycarbonates may be produced by the Schotten-Bauman interfacial reaction of the carbonate precursor with dihydroxy compounds. Typically, an aqueous base such as (e.g., sodium hydroxide, potassium hydroxide, calcium hydroxide, and the like,) is mixed with an organic, water immiscible solvent such as benzene, toluene, carbon disulfide, or dichloromethane, which contains the dihydroxy compound. A phase transfer agent is generally used to facilitate the reaction. Molecular weight regulators may be added either singly or in admixture to the reactant mixture. Branching agents, described forthwith may also be added singly or in admixture.

Polycarbonates can be produced by the interfacial reaction of dihydroxy compounds in which only one atom separates $A^1$ and $A^2$. As used herein, the term "dihydroxy compound" includes, for example, bisphenol compounds having general formula (III) as follows:

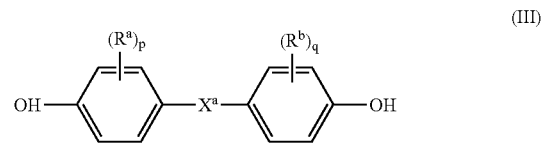

wherein $R^a$ and $R^b$ each independently represent hydrogen, a halogen atom, or a monovalent hydrocarbon group; p and q are each independently integers from 0 to 4; and $X^a$ represents one of the groups of formula (IV):

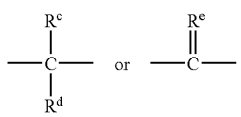

(IV)

wherein $R^c$ and $R^d$ each independently represent a hydrogen atom or a monovalent linear or cyclic hydrocarbon group, and $R^e$ is a divalent hydrocarbon group.

Examples of the types of bisphenol compounds that may be represented by formula (III) includes the bis(hydroxyaryl)alkane series such as, 1,1-bis(4-hydroxyphenyl)methane, 1,1-bis(4-hydroxyphenyl)ethane, 2,2-bis(4-hydroxyphenyl)propane (or bisphenol-A), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, bis(4-hydroxyphenyl)phenylmethane, 2,2-bis(4-hydroxy-1-methylphenyl)propane, 1,1-bis(4-hydroxy-t-butylphenyl)propane, 2,2-bis(4-hydroxy-3-bromophenyl)propane, and the like; bis(hydroxyaryl)cycloalkane series such as, 1,1-bis(4-hydroxyphenyl)cyclopentane, 1,1-bis(4-hydroxyphenyl)cyclohexane, and the like; and the like, as well as combinations comprising at least one of the foregoing bisphenol compounds.

Other bisphenol compounds that may be represented by formula (III) include those where X is —O—, —S—, —SO— or —SO$_2$—. Some examples of such bisphenol compounds are bis(hydroxyaryl)ethers such as 4,4'-dihydroxy diphenylether, 4,4'-dihydroxy-3,3'-dimethylphenyl ether, and the like; bis(hydroxy diaryl)sulfides, such as 4,4'-dihydroxy diphenyl sulfide, 4,4'-dihydroxy-3,3'-dimethyl diphenyl sulfide, and the like; bis(hydroxy diaryl)sulfoxides, such as, 4,4'-dihydroxy diphenyl sulfoxides, 4,4'-dihydroxy-3,3'-dimethyl diphenyl sulfoxides, and the like; bis(hydroxy diaryl)sulfones, such as 4,4'-dihydroxy diphenyl sulfone, 4,4'-dihydroxy-3,3'-dimethyl diphenyl sulfone, and the like; and the like, as well as combinations comprising at least one of the foregoing bisphenol compounds.

Other bisphenol compounds that may be utilized in the polycondensation of polycarbonate are represented by the formula (V)

(V)

wherein, $R^f$, is a halogen atom of a hydrocarbon group having 1 to 10 carbon atoms or a halogen substituted hydrocarbon group; n is a value from 0 to 4. When n is at least 2, $R^f$ may be the same or different. Examples of bisphenol compounds that may be represented by the formula (V), are resorcinol, substituted resorcinol compounds such as 3-methyl resorcin, 3-ethyl resorcin, 3-propyl resorcin, 3-butyl resorcin, 3-t-butyl resorcin, 3-phenyl resorcin, 3-cumyl resorcin, 2,3,4,6-tetrafloro resorcin, 2,3,4,6-tetrabromo resorcin, and the like; catechol, hydroquinone, substituted hydroquinones, such as 3-methyl hydroquinone, 3-ethyl hydroquinone, 3-propyl hydroquinone, 3-butyl hydroquinone, 3-t-butyl hydroquinone, 3-phenyl hydroquinone, 3-cumyl hydroquinone, 2,3,5,6-tetramethyl hydroquinone, 2,3,5,6-tetra-t-butyl hydroquinone, 2,3,5,6-tetrafloro hydroquinone, 2,3,5,6-tetrabromo hydroquinone, and the like; and the like, as well as combinations comprising at least one of the foregoing bisphenol compounds.

Bisphenol compounds such as 2,2, 2', 2'-tetrahydro-3, 3, 3', 3'-tetramethyl-1, 1'-spirobi-[IH-indene]-6, 6'-diol represented by the following formula (VI) may also be used.

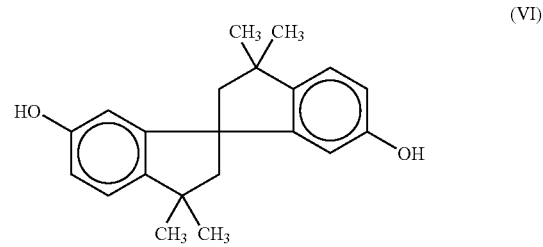

(VI)

The preferred bisphenol compound is bisphenol A.

Typical carbonate precursors include the carbonyl halides, for example carbonyl chloride (phosgene), and carbonyl bromide; the bis-haloformates, for example the bis-haloformates of dihydric phenols such as bisphenol A, hydroquinone, and the like, and the bis-haloformates of glycols such as ethylene glycol and neopentyl glycol; and the diaryl carbonates, such as diphenyl carbonate, di(tolyl) carbonate, and di(naphthyl) carbonate. The preferred carbonate precursor for the interfacial reaction is carbonyl chloride.

It is also possible to employ polycarbonates resulting from the polymerization of two or more different dihydric phenols or a copolymer of a dihydric phenol with a glycol or with a hydroxy- or acid-terminated polyester or with a dibasic acid or with a hydroxy acid or with an aliphatic diacid in the event a carbonate copolymer rather than a homopolymer is desired for use. Generally, useful aliphatic diacids have about 2 to about 40 carbons. A preferred aliphatic diacid is dodecanedioic acid.

Branched polycarbonates are also useful, as well as blends of linear polycarbonate and a branched polycarbonate. The branched polycarbonates may be prepared by adding a branching agent during polymerization. These branching agents may comprise polyfunctional organic compounds containing at least three functional groups, which may be hydroxyl, carboxyl, carboxylic anhydride, haloformyl, and combinations comprising at least one of the foregoing branching agents. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) α,α-dimethyl benzyl)phenol), 4-chloroformyl phthalic anhydride, trimesic acid, benzophenone tetracarboxylic acid, and the like, as well as combinations comprising at least one of the foregoing branching agents. The branching agents may be added at a level of about 0.05 to about 2.0 wt %, based upon the total weight of the substrate.

In one embodiment, the polycarbonate may be produced by a melt polycondensation reaction between a dihydroxy compound and a carbonic acid diester. Examples of the carbonic acid diesters that may be utilized to produce the polycarbonates are diphenyl carbonate, bis(2,4-dichlorophenyl)carbonate, bis(2,4,6-trichlorophenyl) carbonate, bis(2-cyanophenyl) carbonate, bis(o-nitrophenyl) carbonate, ditolyl carbonate, m-cresyl carbonate, dinaphthyl carbonate, bis(diphenyl) carbonate, diethyl carbonate, dimethyl carbonate, dibutyl carbonate, dicyclohexyl carbonate, and the like, as well as combinations comprising at least one of the foregoing carbonic acid diesters. The preferred carbonic acid diester is diphenyl carbonate.

Preferably, the number average molecular weight of the polycarbonate is about 500 to about 1,000,000 grams/mole (g/mole). Within this range, it is desirable to have a number average molecular weight of greater than or equal to about 1,000, preferably greater than or equal to about 5,000 g/mole, and more preferably greater than or equal to about 10,000 g/mole. Also desirable is a number average molecular weight of less than or equal to about 200,000, preferably less than or equal to about 100,000, more preferably less than or equal to about 65,000 g/mole, and most preferably less than or equal to about 35,000 g/mole. The number average molecular weight is measured using a polystyrene standard. An exemplary number average molecular weight is about 14,000 g/mole.

Cycloaliphatic polyesters suitable for use in the polymeric alloys are those, which are characterized by optical transparency, improved weatherability, chemical resistance, and low water absorption. It is also generally desirable that the cycloaliphatic polyesters have good melt compatibility with the polycarbonate resins. Cycloaliphatic polyesters are generally prepared by reaction of a diol with a dibasic acid or derivative. The diols useful in the preparation of the cycloaliphatic polyester resins for use as the high quality optical films are straight chain, branched, or cycloaliphatic, preferably straight chain or branched alkane diols, and may contain from 2 to 12 carbon atoms.

Suitable examples include ethylene glycol, propylene glycol, i.e., 1,2- and 1,3-propylene glycol; butane diol, i.e., 1,3- and 1,4-butane diol; diethylene glycol, 2,2-dimethyl-1,3-propane diol, 2-ethyl, 2-methyl, 1,3-propane diol, 1,3- and 1,5-pentane diol, dipropylene glycol, 2-methyl-1,5-pentane diol, 1,6-hexane diol, 1,4-cyclohexane dimethanol and particularly its cis- and trans-isomers, triethylene glycol, 1,10-decane diol, and mixtures of any of the foregoing. Particularly preferred is dimethanol bicyclo octane, dimethanol decalin, a cycloaliphatic diol or chemical equivalents thereof and particularly 1,4-cyclohexane dimethanol or its chemical equivalents. If 1,4-cyclohexane dimethanol is to be used as the diol component, it is generally preferred to use a mixture of cis- to trans-isomes in ratios of about 1:4 to about 4:1. Within this range, it is generally desired to use a ratio of cis- to trans-isomers of about 1:3.

The diacids useful in the preparation of the cycloaliphatic polyester resins are aliphatic diacids that include carboxylic acids having two carboxyl groups each of which are attached to a saturated carbon in a saturated ring. Suitable examples of cycloaliphatic acids include decahydro naphthalene dicarboxylic acid, norbornene dicarboxylic acids, bicyclo octane dicarboxylic acids. Preferred cycloaliphatic diacids are 1,4-cyclohexanedicarboxylic acid and trans-1,4-cyclohexanedicarboxylic acids. Linear aliphatic diacids are also useful provided the polyester has at least one monomer containing a cycloaliphatic ring. Illustrative examples of linear aliphatic diacids are succinic acid, adipic acid, dimethyl succinic acid, and azelaic acid. Mixtures of diacid and diols may also be used to make the cycloaliphatic polyesters.

Cyclohexanedicarboxylic acids and their chemical equivalents can be prepared, for example, by the hydrogenation of cycloaromatic diacids and corresponding derivatives such as isophthalic acid, terephthalic acid of naphthalenic acid in a suitable solvent, water or acetic acid at room temperature and at atmospheric pressure using suitable catalysts such as rhodium supported on a suitable carrier of carbon or alumina. They may also be prepared by the use of an inert liquid medium wherein an acid is at least partially soluble under reaction conditions and a catalyst of palladium or ruthenium in carbon or silica is used.

Typically, during hydrogenation, two or more isomers are obtained in which the carboxylic acid groups are in cis- or trans-positions. The cis- and trans-isomers can be separated by crystallization with or without a solvent, for example, n-heptane, or by distillation. The cis- isomer tends to blend better, however, the trans-isomer has higher melting and crystallization temperatures and is especially preferred. Mixtures of the cis- and trans-isomers may also be used, and preferably when such a mixture is used, the trans-isomer will preferably comprise at least about 75 wt % and the cis-isomer will comprise the remainder based on the total weight of cis- and trans-isomers combined. When a mixture of isomers or more than one diacid is used, a copolyester or a mixture of two polyesters may be used as the cycloaliphatic polyester resin.

Chemical equivalents of these diacids including esters may also be used in the preparation of the cycloaliphatic polyesters. Suitable examples of the chemical equivalents of the diacids are alkyl esters, e.g., dialkyl esters, diaryl esters, anhydrides, acid chlorides, acid bromides, or the like, or combinations comprising at least one of the foregoing chemical equivalents. The preferred chemical equivalents comprise the dialkyl esters of the cycloaliphatic diacids, and the most preferred chemical equivalent comprises the dimethyl ester of the acid, particularly dimethyl-trans-1,4-cyclohexanedicarboxylate.

Dimethyl-1,4-cyclohexanedicarboxylate can be obtained by ring hydrogenation of dimethylterephthalate, and two isomers having the carboxylic acid groups in the cis- and trans-positions are obtained. The isomers can be separated, the trans-isomer being especially preferred. Mixtures of the isomers may also be used as detailed above.

The polyester resins are typically obtained through the condensation or ester interchange polymerization of the diol or diol chemical equivalent component with the diacid or diacid chemical equivalent component and having recurring units of the formula (VII):

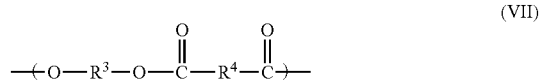

(VII)

wherein $R^3$ represents an alkyl or cycloalkyl radical containing 2 to 12 carbon atoms and which is the residue of a straight chain, branched, or cycloaliphatic alkane diol having 2 to 12 carbon atoms or chemical equivalents thereof; and $R^4$ is an alkyl or a cycloaliphatic radical which is the decarboxylated residue derived from a diacid, with the proviso that at least one of $R^3$ or $R^4$ is a cycloalkyl group.

A preferred cycloaliphatic polyester is poly(1,4-cyclohexane-dimethanol-1,4-cyclohexanedicarboxylate) having recurring units of formula (VIII)

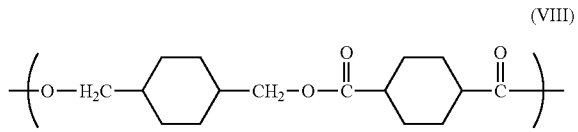
(VIII)

wherein in the formula (VII) $R^3$ is a cyclohexane ring, and wherein $R^4$ is a cyclohexane ring derived from cyclohexanedicarboxylate or a chemical equivalent thereof and is selected from the cis- or trans-isomer or a mixture of cis- and trans-isomers thereof. Cycloaliphatic polyester resins can be generally made in the presence of a suitable catalyst such as a tetra(2-ethyl hexyl)titanate, in a suitable amount, typically about 50 to 400 ppm of titanium based upon the total weight of the final product. It is generally desirable to use poly(1,4-cyclohexane-dimethanol-1,4-cyclohexanedicarboxylate) having an intrinsic viscosity of about 0.82 to about 1.12, preferably about 0.82 to about 0.92.

Poly(1,4-cyclohexanedimethanol-1,4-cyclohexanedicarboxylate) generally suitable blends with the polycarbonate. In addition, a film manufactured from poly(1,4-cyclohexanedimethanol-1,4-cyclohexanedicarboxylate) generally shows excellent adhesion to polycarbonate resin substrates, including polycarbonate blends with other thermoplastics, without using a primer.

BPA polycarbonates are preferred substrate resins for use in this invention. Films comprising blends of poly(1,4-cyclohexane-dimethanol-1,4-cyclohexanedicarboxylate) and polycarbonates also be used as the cap layers of this invention. They exhibit excellent primerless adhesion to a polycarbonate substrate when the film is bonded to the polycarbonate by lamination, hot pressing, in mold decoration, melt extrusion of the polycarbonate on to a poly(1,4-cyclohexane-dimethanol-1,4-cyclohexanedicarboxylate) film, coextrusion of both resins, or any similar bonding or joining technique known to those in the art.

It is generally desirable for a polycarbonate-poly(1,4-cyclohexane-dimethanol-1,4-cyclohexanedicarboxylate) alloy to have a melt volume rate of greater than or equal to about 5 cubic centimeters/10 minutes (cc/10 min or ml/10 min) to less than or equal to about 150 cubic centimeters/10 minutes when measured at 265° C., at a load of 2.16 kilograms, using an orifice size of 2.09 millimeters (0.0825 inches) and 240 seconds dwell time, after drying the sample for 60 minutes at 100° C. Within this range it is generally desirable to have a melt volume rate of greater than or equal to about 7, preferably greater than or equal to about 9, and more preferably greater than or equal to about 10 cc/10 min when measured at 265° C., at a load of 2.16 kilograms and a four minute dwell time. Also desirable within this range is a melt volume rate of less than or equal to about 125, preferably less than or equal to about 110, and more preferably less than or equal to about 100 cc/10 minutes.

In general, it is desirable for the polycarbonate-poly(1,4-cyclohexane-dimethanol-1,4-cyclohexanedicarboxylate) alloy to have a glass transition temperature of less than or equal to about 205° C., preferably less than or equal to about 175° C., and more preferably less than or equal to about 150° C., and most preferably less than or equal to about 125° C.

Additionally, additives such as antioxidants, thermal stabilizers, mold release agents, antistatic agents, whitening agents, colorants, plasticizers, minerals such as talc, clay, mica, barite, wollastonite and other stabilizers including but not limited to UV stabilizers, such as benzotriazole, supplemental reinforcing fillers such as flaked or milled glass, and the like, flame retardants, pigments, additional resins or combinations thereof may be added to the compositions of the present invention. The different additives that can be incorporated in the compositions are commonly used and known to one skilled in the art. Illustrative descriptions of such additives may be found in R. Gachter and H. Muller, Plastics Additives Handbook, 4th edition, 1993.

Examples of thermal stabilizers include triphenyl phosphite, tris-(2,6-dimethylphenyl)phosphite, tris-(2,4-di-t-butyl-phenyl) phosphite, tris-(mixed mono- and di-nonylphenyl)phosphite, dimethylbenzene phosphonate and trimethyl phosphate. Examples of antioxidants include octadecyl-3-(3,5-di-tert-butyl-4-hydroxyphenyl)propionate, and pentaerythritol-tetrakis[3-(3,5-di-tert-butyl-4-hydroxyphenyl) propionate]. Examples of light stabilizers include 2-(2-hydroxy-5-methylphenyl)benzotriazole, 2-(2-hydroxy-5-tert-octylphenyl)-benzotriazole and 2-hydroxy-4-n-octoxy benzophenone. Examples of plasticizers include dioctyl-4,5-epoxy-hexahydrophthalate, tris-(octoxycarbonylethyl)isocyanurate, tristearin and epoxidized soybean oil. Examples of the antistatic agents include glycerol monostearate, sodium stearyl sulfonate, and sodium dodecylbenzenesulfonate.

A preferred class of stabilizers including quenchers are those which provide a transparent/translucent and colorless product. Typically, such stabilizers are used at a level of about 0.001 to about 10 wt %, and preferably at a level of about 0.005 to about 2 wt %, based on the total weight of the film. The favored stabilizers include an effective amount of an acidic phosphate salt; an acid, alkyl, aryl or mixed phosphite having at least one acidic hydrogen; a Group IB or Group IIB metal phosphate salt; a phosphorus oxo acid, a metal acid pyrophosphate or a mixture thereof. The suitability of a particular compound for use as a stabilizer and the determination of how much is to be used as a stabilizer may be readily determined by preparing a mixture of the polyester resin component and the polycarbonate and determining the effect on melt viscosity, gas generation or color stability or the formation of interpolymer. The acidic phosphate salts include sodium dihydrogen phosphate, mono zinc phosphate, potassium hydrogen phosphate, calcium dihydrogen phosphate and the like. The phosphites may be of the formula (IX):

(IX)

where R1, R2 and R3 are independently selected from the group consisting of hydrogen, alkyl and aryl with the proviso that at least one of $R_1$, $R_2$ and $R_3$ is hydrogen.

The phosphate salts of a Group IB or Group IIB metal include zinc phosphate and the like. The phosphorus oxo acids include phosphorous acid, phosphoric acid, polyphosphoric acid or hypophosphorous acid.

The polyacid pyrophosphates may be of the formula X:

$$M_{zx}H_yP_nO_{3n+1} \qquad (X)$$

wherein M is a metal, x is a number ranging from 1 to 12 and y is a number ranging from 1 to 12, n is a number from 2 to 10, z is a number from 1 to 5 and the sum of (xz)+y is equal to n+2. The preferred M is an alkaline or alkaline earth metal.

The most preferred quenchers are oxo acids of phosphorus or acidic organo-phosphorus compounds. Inorganic acidic phosphorus compounds may also be used as quenchers, however they may result in haze or loss of clarity. Most preferred quenchers are phosphoric acid, phosphorous acid or their partial esters.

Examples of mold releasing agents include pentaerythritol tetrastearate, stearyl stearate, beeswax, montan wax, and paraffin wax. Examples of other resins include but are not limited to polypropylene, polystyrene, polymethyl methacrylate, and polyphenylene oxide. Combinations of any of the foregoing additives may be used. Such additives may be mixed at a suitable time during the mixing of the components for forming the composition.

The thermoplastic polymeric resins may be blended in any desired suitable ratios to form the polymeric alloy. Binary blends, ternary blends and blends having more than three resins may also be used in the polymeric alloys. When a binary blend or ternary blend is used in the polymeric alloy, one of the polymeric resins in the alloy may comprise about 1 to about 99 weight percent (wt %) based on the total weight of the composition. Within this range, it is generally desirable to have the one of the polymeric resins in an amount greater than or equal to about 20, preferably greater than or equal to about 30 and more preferably greater than or equal to about 40 wt %, based on the total weight of the composition. Also desirable within this range, is an amount of less than or equal to about 90, preferably less than or equal to about 80 and more preferably less than or equal to about 60 wt % based on the total weight of the composition. When ternary blends of blends having more than three polymeric resins are used, the various polymeric resins may be present in any desirable weight ratio.

The production of the compositions may utilize any of the blending operations known for the blending of thermoplastics, for example blending in a kneading machine such as a Banbury mixer or an extruder. The sequence of addition is not critical but all components should be thoroughly blended. To prepare the resin composition, the components may be mixed by any known methods. The mixing may conducted by first premixing the desired components for the composition and then melt mixing the components. In the premixing, the dry ingredients are mixed together. The premixing is generally performed using a tumbler mixer or ribbon blender. However, if desired, the premixing may be conducted in a high shear mixer such as a Henschel mixer or similar high intensity device. The premixing is followed by the melt mixing, where the premix is melted and mixed again as a melt. Alternatively, the premixing may be omitted, and the components of the composition may be added directly into the feed section of a melt mixing device. In the melt mixing step, the ingredients are typically melt kneaded in a single screw or twin screw extruder, a Banbury mixer, a two roll mill, or the like, or a combination comprising at least one of the foregoing melt mixing devices.

In order to make a polymeric alloy without any defects such as comets and veins, it is generally desirable to deform the alloy into a film at lower temperatures and at lower speeds than is normally undertaken in the processing of such films. In general, with regard to the lower temperatures at which such deformational forces are applied, it is generally desirable to deform the alloy at temperatures below the glass transition temperature of the alloy. Thus while the temperature of the alloy is not always necessarily below the glass transition temperature ($T_g$) of the alloy, the device through which the deformational force is applied, is held at a temperature that is lower than the glass transition temperature of the alloy.

In an exemplary embodiment, the deforming forces are shear, compressive or elongational forces or a combination of any two of the aforementioned forces or a combination of all three forces if desired. These deformational forces may be applied either simultaneously or sequentially if desired. It is generally desired to maintain the temperature of the machine part contacting the alloy and applying these deformational forces at temperatures below the $T_g$ of the alloy. In another exemplary embodiment, it is desirable to maintain the temperature of the machine part contacting the alloy and applying the deformational forces at 5° C., preferably 10° C., more preferably 15° C. and most preferably 20° C. below the $T_g$ of the alloy.

In order to produce a film or sheet having a reduced number of comets or veins, it is generally desirable to deform the alloy in an amount effective to impart to the deformed alloy a birefringence retardation of greater than or equal to about 350 nanometers (nm). It is generally preferred to have a birefringence retardation greater than or equal to about 400 nm, preferably greater than or equal to about 550 nm, preferably greater than or equal to about 750 nm, and more preferably greater than or equal to about 1000 nm.

The film or sheet obtained as a result of the aforementioned deforming forces generally has a number of less than or equal 0.25 comets/square centimeter, preferably less than or equal to about 0.2 comets/square centimeter, and more preferably less than or equal to about 0.1 comets/square centimeter. It is most preferable to have the film or sheet substantially free from comets.

In another embodiment, a polymeric alloy film or sheet having defects such as comets and veins can be rendered substantially comet-free and vein-free by annealing the film or sheet at a temperature that is proximate to a glass transition temperature ($T_g$) of the polymeric resin (in the alloy). In one embodiment, it is desirable to anneal the film or sheet to a temperature that is proximate to the highest glass transition temperature of the polymeric alloy. In another embodiment, it is desirable to anneal the film or sheet to a temperature that is proximate to the lowest glass transition temperature of the polymeric alloy. In yet another embodiment, it is desirable to anneal the film or sheet to a temperature greater than or equal to about to the highest glass transition temperature of the polymeric alloy. For example, if $T_{gA}$ is the glass transition temperature of polymeric resin A and $T_{gB}$ is the glass transition temperature of polymeric resin B both of which are contained in a polymeric alloy having an alloy glass transition temperature of $T_{g(A+B)}$, such that $T_{gB} > T_{g(A+B)} > T_{gA}$, then annealing the alloy at a temperature greater than or equal to $T_{gB}$ will render the alloy comet-free or defect free. In another embodiment, it is desirable to anneal the film or sheet to a temperature of up to about 10° C. lower than the highest glass transition temperature of a polymeric resin used to form the polymeric alloy. In yet another embodiment, it is desirable to anneal the film at a temperature of about equal to the highest glass transition temperature of the polymeric resins used to form the polymeric alloy.

While annealing at a temperature proximate to the highest $T_g$ in the alloy will generally reduce or minimize the number of comets and/or veins in the alloy, it is not always necessary to do so. For example, if it is known that the comets and/or veins are formed only in the polymeric resin A, having the lower glass transition temperature $T_{gA}$, or in the interface between resin A and B, then it may be desirable to heat to a temperature proximate to about $T_{gA}$ and less than or equal to about $T_{g(A+B)}$ or alternatively it may also be desirable to heat the polymeric alloy to a temperature of about $T_{g(A+B)}$ to about $T_{gB}$ to eliminate the comets and/or veins. Thus, the annealing of a film or sheet manufactured from a polymeric alloy may be conducted at a temperature proximate to a lowest glass transition temperature of the polymeric alloy. For example, the annealing may be conducted at a temperature of greater than or equal to about 10° C. below the lowest glass transition temperature of the polymeric alloy.

It is generally desirable to anneal the polymeric alloy films or sheets for a time period of up to about 30 minutes. Within this range it is generally desirable to anneal the film for a time period greater than or equal to about 10 seconds, preferably greater than or equal to about 60 seconds, preferably greater than or equal to about 1 minute, and most preferably greater than or equal to about 2 minutes. Also desirable within this range, is an annealing time of less than or equal to about 25 minutes, preferably less than or equal to about 20 minutes, and more preferably less than or equal to about 15 minutes. The film or sheet may be annealed either using conduction, convection, radiation or combinations comprising at least one of the foregoing methods of heating.

In yet another exemplary embodiment, a film prepared from a polymeric alloy having a melt volume rate greater than or equal to about 10 cubic centimeter/10 minutes (cc/10 min) in the above described manner may be molded over a temperature sensitive substrate at a temperature low enough so as not to destroy or disturb the substrate. The molding of the film onto the substrate results in a multilayered composite having a birefringence retardation of greater than or equal to about 350 nm. The high melt volume rate of the alloy permits the alloy to be molded at temperatures less than or equal to about 400° F. Despite the ability of the alloy to be molded at low temperatures of less than or equal to about 400° F., they preserve their inherent superior mechanical properties thus provide adequate protection to the substrate. The properties of the alloy may be further improved by the addition of impact modifiers to the alloy. A suitable example of a low temperature substrate over which these alloys may be molded at temperatures of less than or equal to about 400° F., is a polarizer in an application for polarizing sunglasses. In one embodiment, the multilayered composite may be annealed to a temperature effective to impart a birefringence retardation of less than or equal to about 150 nm.

In general when a film or sheet having comets is annealed to render it substantially free from comets, the film will preferably have a birefringence retardation of less than or equal to about 150 nm, preferably less than or equal to about 100 nm, preferably less than or equal to about 75 nm, preferably less than or equal to about 50 nm, and more preferably less than or equal to about 25 nm.

In one embodiment, in one method of manufacturing the polymeric alloy, a blend comprising polycarbonate and poly(1,4-cyclohexanedimethanol-1,4-cyclohexanedicarboxylate) are first extruded in a twin screw extruder. The extrudate is pelletized and dried. The pellets are then extruded in a single screw extruder and the extrudate from the single screw extruder is fed to a calendaring two roll mill having both rolls polished. Such a roll mill is often referred to as a polish/polish calendaring roll mill. The surfaces of the roll mill are held at a temperature less than or equal to about the $T_g$ of the alloy and the calendaring is conducted at a speed effective to produce a birefringence retardation of greater than or equal to about 350 nm.

The films obtained from the above detailed method are optically clear, and can be manufactured in compositions having a high melt rate so as to permit them to be molded upon substrates that can withstand temperatures of less than or equal to about 400° F. Polymeric alloys manufactured in such a manner advantageously do not possess any defects such as comets and veins and therefore can be utilized in optical applications such as optical elements, ophthalmic sheets, microscopes and the like. In addition additives which facilitate the incorporation of functional properties such as light polarization, photo-chromism, tint, color, decor, indicia, hardness, anti-abrasion, anti fog, X-ray recording capabilities, photographic film capabilities, digital storage capabilities, light management capabilities, and the like may be added to the polymeric alloy.

In one embodiment, the films obtained from the above detailed method can have substrates back molded onto them to create a multilayered composite that is optically transparent and has a birefringence retardation of greater than or equal to about 350 nm. In one embodiment, the multilayered composite can have a birefringence retardation of greater than or equal to about 400 nm, preferably greater than or equal to about 550 nm, preferably greater than or equal to about 750 nm, and more preferably greater than or equal to about 1000 nm. Back molding is that process where a film having a birefringence retardation of greater than or equal to about 350 nm is placed in mold following which the substrate is molded onto the film. The substrate may be injection molded, compression molded, blow molded, vacuum formed, extruded or gas assisted blow molded onto the film.

It is generally preferable for the substrate of the multilayered composite to have a composition similar to that of the film. In one embodiment, the substrate may have at least one polymeric component that has a composition similar to at least one polymeric component in the film in order to facilitate compatibility between the substrate and the film. In another embodiment, the substrate and/or the film may have a reactive functional group that can react with another reactive functional group in either the film and/or substrate respectively so as to facilitate compatibility between the film and substrate. In yet another embodiment, an adhesive may be used between the substrate and the film to effect bonding between the film and substrate. The adhesive may be a UV (ultraviolet) curable adhesive that may be cured upon the application of UV light to the multilayered composite. Other additives such as those listed above may be added to the substrate in addition to the film. When an adhesive is used, the film and the substrate may be laminated together if desired.

In one embodiment, back molding may occur via a process of coextrusion. In coextrusion, the desired composition for the film and the substrate may be separately precompounded prior to coextrusion. In this event, the precompounded materials may be first melt blended in a twin screw extruder, single screw extruder, buss kneader, roll mill, or the like, prior to being formed into a suitable shapes such as pellets, sheets, and the like, for further co-extrusion. The precompounded film and substrate compositions may then be fed into the respective extruders for co-extrusion.

In one embodiment, in one manner of co-extruding of the multilayered composites, the melt streams (extrudates) from the various extruders are fed into a feed block die where the various melt streams are combined before entering the die.

In another embodiment, the melt streams from the various extruders are fed into a multi-manifold internal combining die. The different melt streams enter the die separately and join just inside the final die orifice. In yet another embodiment, the melt streams from the various extruders are fed into a multi-manifold external combining die. The external combining dies have completely separate manifolds for the different melt streams as well as distinct orifices through which the streams leave the die separately, joining just beyond the die exit. The layers are combined while still molten and just downstream of the die. An exemplary die used in the production of the multilayered composite is a feed block die. In an exemplary embodiment, the extruders used for the co-extrusion of the film and the substrate are single screw extruders respectively. The co-extruded sheet may optionally be calendared in a roll mill if desired.

A desirable form of the coextruded multilayered composite is an extruded sheet, including solid sheets, multi-wall sheets, and profiled sheets. There is no particular limitation on the composition of additional layers used to form coextruded sheets. There is no particular limitation on the structure or geometry of the multi-wall sheets. The additional layers may comprise, for example, fluorescing agents to facilitate manufacturing and/or ultraviolet light absorbers to improve weatherability. The multilayered composite have a weight in an amount of about 0.5 to about 15 kilograms per square meter, and preferably have a thickness in an amount of about 0.5 millimeter (mm) to about 15 mm, preferably in an amount of about 1 mm to about 12 mm. It is desirable for the extruded multi-wall sheets to have a weight of about 0.5 to about 8 kilograms, and a thickness of about 2 to about 50 mm, preferably about 4 to about 40 mm.

The multilayered composite may be used to form lenses for optical devices such as spectacles, telescopes, microscopes, or the like. The lenses may be created by retaining a film in a mold having the shape of the desired lens and back molding the substrate. Alternatively the multilayered composite may be thermoformed into a lens having the desired shape. Additional machining processes may be conducted on the lens, if desired.

Suitable examples of thermoplastic polymers that can be used as the substrate are polyacetals, polyacrylics, polycarbonates polystyrenes, polyesters, polyamides, polyamideimides, polyarylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polypyrrolidines, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, or the like, or combinations comprising at least one of the foregoing thermoplastic polymers. In one embodiment, in the manufacturing of a multilayered composite, when the film comprises polycarbonate and PCCD, it is desirable for the substrate to comprise polycarbonate, polyester, or a blend and/or copolymer of a polycarbonate and a polyester. The multilayered composite is preferably formed by injection molding.

The following examples, which are meant to be exemplary, not limiting, illustrate compositions and methods of manufacturing some of the various embodiments of the environmentally resistant coatings using various materials and apparatus.

EXAMPLES

Example 1

This example was conducted to demonstrate that a film of a polymeric alloy comprising polycarbonate and poly(1,4-cyclohexanedimethanol-1,4-cyclohexanedicarboxylate) could be manufactured without any comets and veins when examined under polarized light. Additionally this experiment was conducted to demonstrate that a film of a polymeric alloy can be annealed to remove any existing comets and/or veins. The film was made by extruding an alloy of polycarbonate and poly(1,4-cyclohexanedimethanol-1,4-cyclohexanedicarboxylate) in a weight ratio of 1:1 in a 70 millimeter (mm) Werner and Pfleiderer (mega-compounder) twin screw extruder. A quencher comprising phosphoric acid was used to minimize any reaction between the polycarbonate and the poly(1,4-cyclohexanedimethanol-1,4-cyclohexanedicarboxylate). No UV inhibitors were used in these examples. The alloy was first pelletized and dried at a temperature of about 180° F. for 6 hours. The dried pellets were then extruded in a single screw extruder having a 4.5 inch (11.43 centimeters) screw diameter. The single screw extruder was a single stage, barrier type extruder with an L/D of 32:1 and with a flex lip die. The extrusion conditions are shown in Table 1.

TABLE 1

| Parameter | Value |
| --- | --- |
| Extruder diameter (inches) | 4.5 |
| Drying temperature (° F.) | 180 |
| Drying Time (hours) | 6 |
| Extruder Temperatures (° F.) | Pre-set |
| Zone 1 (° F.) | 380 |
| Zone 2 (° F.) | 400 |
| Zone 3 (° F.) | 410 |
| Zone 4 (° F.) | 420 |
| Zone 5 (° F.) | 440 |
| Zone 6 (° F.) | 460 |
| Adapter Temperature (F.) | 460 |
| Die Lips Temperature (° F.) | 488 |
| Screw RPM | 21.4 |
| Extruder Amps | 212 |
| Screen mesh | 105 |
| Roll Stack Temperature (° F.) | 175/165 |
| Nip force PLI lbf/inch | 161 |
| Production speed (feet/min) | 14.2 |

The extrudate from the single screw extruder was fed into a highly polished oil cooled roll stack. The film emerging from the roll stack is a polish/polish film having a thickness of 20 mils. The film obtained in this manner was free from comets and/or veins.

Example 2

The films in this example were similar in composition to those of Example 1 above and were processed in a similar manner except for the production speed of the calendaring rolls and the temperature of the rolls. Data for all the samples is shown in the table below. At least five measurements were made on each sample. Samples 1, 2 and 3 are comparative examples, while sample 4 is the sample obtained from Example 1 above. Sample 5 is a sample, which was annealed at 150° C. for 3 minutes.

TABLE 2

|  | Comparative Example (Sample #1) | Comparative Example (Sample #2) | Comparative Example (Sample #3) | Invention Example (Sample #4) | Invention Example (Sample #5) |
|---|---|---|---|---|---|
| Defects comets/veins | No | Yes | Yes | No | No |
| Birefringence Retardation (nm) | 500 | 450 | 650 | 950 | 8 |
| Production speed (ft/min) | 20 | 20.8 | 14.94 | 14.4 | 20.8 |
| Roll 2 Temperature (° F.) | 250 | 165 | 180 | 165 | 165 |
| Nip force (lbf) | 3710 | 2590 | 2750 | 3380 | 2590 |
| Annealing at for 15 minutes at 150° C. | Not annealed | Not annealed | Not annealed | Not annealed | Yes |
| Resin | PC | PC/PCCD | PC/PCCD | PC/PCCD | PC/PCCD |

As may be seen from Table 2, as the production speed and the temperature of the rolls is reduced, the comets and veins disappear. This is clearly demonstrated in Sample #4 where a production speed of 14.4 feet/minute and a roll temperature of 165° C. produces a film having no comets or veins. Similarly, for Sample #5, the annealing at 150° C. removes all comets and veins. In general annealing may preferably be conducted at a temperature proximate to the highest glass transition temperature of the alloy. In one embodiment, it is desirable to anneal the polymeric alloy to a temperature of at least about 10° C. below the highest glass transition temperature of the polymeric alloy. In another embodiment, it is desirable to anneal the polymeric alloy to a temperature equal to the highest glass transition temperature of the polymeric alloy. In yet another embodiment, it is desirable to anneal the polymeric alloy to a temperature greater than the highest glass transition temperature of the polymeric alloy. In yet another embodiment, it is desirable to anneal the polymeric alloy in a constrained condition.

Figure 2:
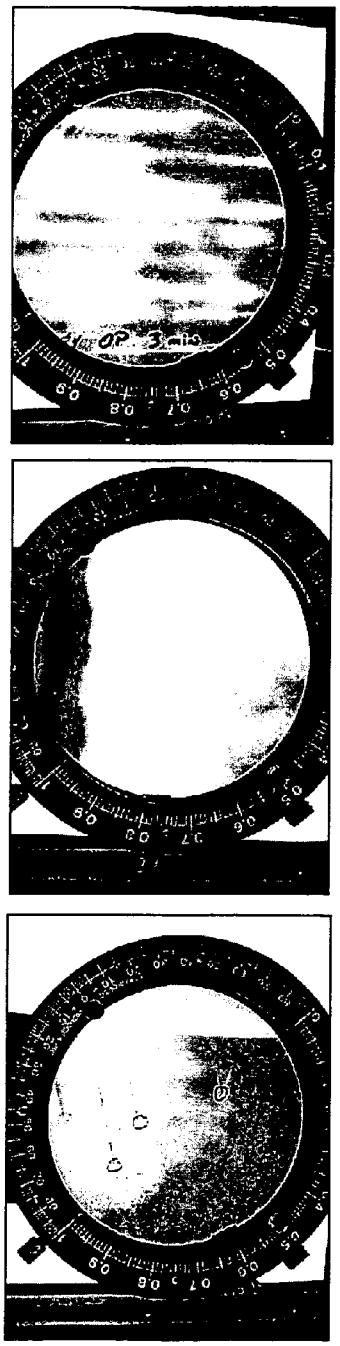
FIG. 2 is a photograph showing (a) comets and veins from sample #2 (b) comet and vein free sample #4 and (c) comet and vein free sample #5.

The comets and veins seen in the comparative examples of Table 2 may be seen in the FIG. 2 below when the corresponding films are examined under polarized light. Similarly, the sample #4 and sample #5 shown in the FIG. 2 show no comets and veins when examined under polarizing light. The films in Samples #4 is a high quality optical film and show a birefringence retardation of about 750 to about 925 nm. Sample #5, which was annealed for 15 minutes at 150° C. shows a birefringence retardation of less than 150 nm and does not display any comets and/or veins.

Example 3

These examples were undertaken in order demonstrate that it is possible to obtain polycarbonate-polyester blends having very high melt volume rates (low melt viscosity) and are therefore excellent for low temperature processability. Such blends can be molded over substrates over films having a low thermal resistance, i.e., the films degrade upon being subjected to high temperatures. The blend contains high flow polycarbonate, poly(1,4-cyclohexanedimethanol-1,4-cyclohexanedicarboxylate), oligomeric polycarbonate (R2 oligomer), pentaerythritol tetrastearate, and phosphoric acid pre-diluted to 10%. Despite the low melt viscosity, these blends still have good mechanical and physical properties, as evidenced from Table 3, and 4. These results are generally unexpected, since a low melt viscosity generally translates to poor mechanical and physical properties. When the blends have low Izod impact properties, the properties may be increased by the inclusion of impact modifiers such as Blendex 415 as shown in Table 5. Table 6 compares the processing properties of PMMA and polycarbonate where it may be seen that polymeric resins having a high melt volume rate generally demonstrate a loss in mechanical properties. Table 7 highlights the ease of low temperature processing of the blends. Tables 8 (a) and (b) show that low melt viscosity polycarbonate can also be used to make polymeric blends that can be processed at low temperatures similar to blends reported in Table 3 and 4 using the oligomeric polycarbonate. Formulations in Table 9 can all be processed at temperatures less than 205° C. and show the effect of the percent low melt viscosity polycarbonate on the mechanicals of the polymeric blends.

Following is a list of the tests performed on the samples shown in the Tables 3 to 9.

Optical properties (transmission and haze) are measured according ASTM D1003.

Yellowness index is determined according ASTM D1925 where 3.2 mm thick plaques are measured on a Gardner XL-835 Colorimeter.

Impact values are measured on 3 mm thick bars according ISO 180/1A.

From the granules, the melt volume rate (MVR) was measured according ISO 1133 (265° C./2.16 kg, 240 seconds dwell time, 0.0825" orifice, dried 60 minutes at 100° C., unless otherwise stated) in units of $cm^3/10$ min.

Notched Izod: This test procedure is based on the ASTM D256 method. In this case, using Izod Method E, the unnotched impact strength is obtained by testing an unnotched specimen. The results of the test is reported in terms of energy absorbed per unit of specimen width, and expressed in foot-pounds per inch (ft-lbs/in.). Typically the final test result is calculated as the average of test results of five test bars.

Dynatup (also known as Multi-axial impact) test: This test procedure is based on the ASTM D3763 method. This procedure provides information on how a material behaves under multiaxial deformation conditions. The deformation applied is a high speed puncture. An example of a supplier of this type of testing equipment is Dynatup. Reported as the test results are the so-called ductility, expressed in %, impact energy, expressed in foot times pounds (ft-lbf), and/or total energy ft-lbf. The final test result is calculated as the average of the test results of typically ten test plaques.

Melt viscosity: This test procedure is based on the ASTM D1238 method. The equipment used is an extrusion plastometer equipped with an automatic timer. A typical example of this equipment would be the Tinius Olson MP 987. Before testing, the samples are dried for one hour at 150° C. The testing conditions are a melt temperature of 266° C., a total load of 5,000 gram, an orifice diameter of 0.0825 inch, and a dwell time of 5 minutes. The test result is expressed in the unit Poise.

Flexural Modulus: This test procedure is based on the ASTM D790 method. Typical test bars have the following dimensions: ⅛ inch×½ inch×2–½ inch. The final test result was calculated as the average of test results of five test bars. The test involves a three point loading system utilizing center loading on a simply supported beam.

Instron and Zwick are typical examples of manufacturers of instruments designed to perform this type of test. The flexural modulus is the ratio, within the elastic limit, of stress to corresponding strain and is expressed in pounds per square inch (psi).

Tensile Strength: This test procedure is based on the ASTM D638 method. Test bars in the form of the standard dumbbell shape are used in this test method. The final test result is calculated as the average of the test results of five test bars. The tensile strength is calculated by dividing the maximum load observed in the test by the original minimum cross-sectional area of the test specimen. The result is expressed in pounds per square inch (psi). Instron and Zwick are typical examples of manufacturers of instruments designed to perform this type of test.

Tensile Elongation: the ability of a material to resist breaking under tensile stress is based upon ASTM D638. Samples were injection molded. The tensile testing machine pulls the sample from both ends and measures the force required to pull the specimen apart and how much the sample stretches before breaking. The ultimate elongation of a plastic is the percentage increase in length that occurs before it breaks under tension.

TABLE 3

|  | Sample #6 | Sample #7 | Sample #8 | Sample #9 | Sample #10 | Sample #11 |
|---|---|---|---|---|---|---|
| Composition |  |  |  |  |  |  |
| PC high flow | 14.470 | 44.470 | 39.470 | 26.970 | 29.470 | 49.470 |
| PCCD, 2k poise | 50.000 | 20.000 | 50.000 | 50.000 | 35.000 | 30.000 |
| R2 oligomer | 35.000 | 35.000 | 10.000 | 22.500 | 35.000 | 20.000 |
| Pentaerythritol tetrastearate | 0.300 | 0.300 | 0.300 | 0.300 | 0.300 | 0.300 |
| Phosphoric acid pre-diluted to 10% | 0.075 | 0.075 | 0.075 | 0.075 | 0.075 | 0.075 |
| PEP-Q | 0.150 | 0.150 | 0.150 | 0.150 | 0.150 | 0.150 |
| Total | 100 | 100 | 100 | 100 | 100 | 100 |
| Physical Properties |  |  |  |  |  |  |
| Flexural Mod. (PSI) | 285000 | 350000 | 274000 | 276000 | 315000 | 325000 |
| Secant Mod. @2% Strain (PSI) | 281000 | 344000 | 271000 | 270000 | 311000 | 320000 |
| Flexural Str. (PSI) | 11800 | 13100 | 11700 | 11600 | 13200 | 13800 |
| HDT (° C.) | 71.3 | 93.3 | 77.5 | 73.8 | 81.3 | 89.2 |
| HDT (Parts, in ° C.) | 81.2 | 105.5 | 88.2 | 84.4 | 93.1 | 102.0 |
| Izod: Ductility (%) | 0 | 0 | 0 | 0 | 0 | 0 |
| Izod Impact Strength(lbf/in) | 0.229 | 0.208 | 4.744 | 0.523 | 0.201 | 1.108 |
| Multi-axial Impact Ductility(%) | 0 | 0 | 100 | 80 | 0 | 80 |
| Energy to Max Load(ft-lbf) (By Multi-axial Impact Test) | 7.2 | 5.1 | 42.8 | 29.5 | 15.5 | 24.7 |
| Total Energy(ft-lbf) (By Multi-axial Impact Test) | 7.9 | 5.5 | 54.6 | 35.4 | 16.9 | 27.5 |
| MVR(cm$^3$/10 min) | 90.90 | 76.40 | 36.60 | 57.70 | 80.40 | 48.90 |
| Tensile Modulus(PSI) | 275000 | 364000 | 260000 | 258000 | 290000 | 307000 |
| Tensile Stress@Yield(PSI) | 7510 | 8580 | 7400 | 7520 | 8290 | 8240 |
| Tensile Stress@Break(PSI) | 5110 | 6660 | 6550 | 6470 | 5360 | 6410 |
| Tensile Elongation@Yield(%) | 4.83 | 4.78 | 5.38 | 5.14 | 5.30 | 5.04 |
| Tensile Elongation@Break(%) | 141.90 | 39.34 | 166.82 | 149.00 | 96.66 | 83.20 |
| Yellowness Index | 19.10 | 4.00 | 12.70 | 13.10 | 9.60 | 6.60 |
| Transmission | 85.30 | 87.40 | 82.10 | 87.80 | 88.70 | 86.20 |
| Haze | 6.500 | 5.200 | 10.800 | 3.400 | 3.600 | 6.000 |

It is desirable for low temperature blends to have desirable mechanical properties. The formulations shown in Table 3, i.e., Samples #8, #9 and #11, show a high value of toughness as indicated by multi-axial impact test results.

TABLE 4

|  | Sample #12 | Sample #13 | Sample #14 | Sample #15 |
|---|---|---|---|---|
| Composition |  |  |  |  |
| PC high flow | 14.320 | 29.320 | 64.550 | 0.0 |
| PCCD, 2k poise | 50.000 | 35.000 | 0.000 | 64.320 |
| R2 oligomer | 35.000 | 35.000 | 35.000 | 34.78 |
| Pentaerythritol tetrastearate | 0.300 | 0.300 | 0.300 | 0.300 |
| Phosphoric acid pre-diluted to 10% | 0.225 | 0.225 | 0.000 | 0.45 |
| PEP-Q | 0.150 | 0.150 | 0.150 | 0.150 |
| Total | 100 | 100 | 100 | 100 |
| Properties |  |  |  |  |
| Flexural Modulus in PSI | 281000 | 315000 | 381000 | 247000 |
| HDT-ASTM in °C. | 72.2 | 84.6 | 110.1 | 63.0 |
| Impact Strength -Room Temp. in lbf/in (By Izod Impact Test) | 0.208 | 0.237 | 0.222 | 0.251 |
| Ductility - Room Temp. in % (By Izod Impact Test) | 0 | 0 | 0 | 0 |
| Ductility - Room Temp. in % (By Multi-axial Impact Test) | 60 | 0 | 0 | 80 |
| Total Energy-Room Temp in ft-lbf (By Multi-axial Impact Test) | 28.7 | 7.7 | 7.8 | 32.2 |
| Total Energy at 0° C. in ft-lbf (By Multi-axial Impact Test) | 25.9 | 5.1 | 5.5 | 3.1 |
| Ductility at 0° C. in % (By Multi-axial Impact Test) | 40 | 0 | 0 | 0 |
| Tensile Modulus in PSI | 266000 | 310000 | 391000 | 229000 |
| Tensile Elongation @ Break in % | 161.26 | 76.54 | 30.14 | 195.00 |
| Yellowness Index | 3.80 | 3.30 | 2.80 | 3.90 |
| Transmission in % | 88.80 | 88.40 | 89.00 | 88.00 |
| Haze in % | 2.100 | 2.100 | 2.100 | 5.900 |
| Melt Volume Rate in cm$^3$/10 min. | 82.59 | 77.66 | 57.26 | 92.98 |

TABLE 5

|  | Sample #16 | Sample #17 |
|---|---|---|
| Composition |  |  |
| PC high flow | 12.66 | 11.00 |
| PCCD, 2k poise | 48.33 | 46.670 |
| R2 oligomer | 33.33 | 31.670 |
| Pentaerythritol tetrastearate | 0.300 | 0.300 |
| Phosphoric Acid pre-diluted to 10% | 0.225 | 0.225 |
| PEP-Q | 0.150 | 0.150 |
| Blendex - 415 | 5.00 | 10.00 |
| Total | 100 | 100 |
| Properties |  |  |
| Impact Strength -Room Temp. in lbf/in (By Izod Impact Test) | 0.193 | 2.834 |
| Ductility - Room Temp. in % (By Izod Impact Test) | 0 | 100 |
| Impact Strength at 0° C. in lbf/in (By Izod Impact Test) | 0.266 | 0.166 |
| Ductility at 0° C. in % (By Izod Impact Test) | 0 | 0 |
| Ductility - Room Temp. in % (By Multi-axial Impact Test) | 0 | 80 |
| Total Energy-Room Temp in ft-lbf (By Multi-axial Impact Test) | 10.8 | 39.4 |
| Ductility at −30° C. in % (By Multi-axial Impact Test) | 0 | 60 |
| Total Energy at −30° C. in ft-lbf (By Multi-axial Impact Test) | 5.7 | 26.9 |
| Yellowness Index | 7.5 | 8.20 |
| Transmission in % | 86.10 | 86.10 |
| Haze in % | 11.30 | 8.30 |
| Melt Volume Rate in cm$^3$/10 min | 53.48 | 36.17 |

TABLE 6

|  | PC 105 | PMMA |
|---|---|---|
| Composition |  |  |
| PC 105 | 100 |  |
| PMMA |  | 100 |
| Properties |  |  |
| Melt Volume Rate at 250 C. & 5 kg load in cm$^3$/10 min | 3.8 | 36.2 |
| Heat Distortion Temperature in °C. | 127.7 | 76.9 |
| Tensile Modulus in MPa | 2312 | 3091 |
| Tensile Yield Strength in MPa | 61.9 | 63.4 |
| Tensile Elongation at Break in % | 126.3 | 2.5 |
| Impact Strength -Room Temp. in lbf/in (By Izod Impact Test) | 73.3 | 2.8 |
| Ductility - Room Temp. in % (By Izod Impact Test) | 100% | 0 |
| Maximum Force -Room Temp in N (By Multi-axial Impact Test) | 10923 | 942 |
| Total Energy-Room Temp in J (By Multi-axial Impact Test) | 131 | 1.3 |
| Energy at Break -Room Temp in J (By Multi-axial Impact Test) | 137.7 | 2.6 |
| Deflection at Break-Room Temp. in mm (By Multi-axial Impact Test) | 23.1 | 5.3 |
| Ductility - Room Temp. in % (By Multi-axial Impact Test) | 100 | 0 |
| Color Standard (L) | 93.36 | 92.81 |
| Initial Color (Engel 1, A) | −0.18 | −0.07 |
| Color Reflection (B) | 3.21 | 4.05 |
| Transmission in % | 91.2 | 92.2 |
| Haze in % | 2.38 | 4.1 |
| Initial Gloss at 20 degree | 179.9 | 136.1 |
| Initial Gloss at 60 degree | 164.8 | 127.7 |

TABLE 7

| Composition | PC | PCCD | R2 | Sample #18 | Sample #19 | Sample #20 | Sample #20 | Sample #21 | Sample #22 |
|---|---|---|---|---|---|---|---|---|---|
| PC high flow | 100 | | | 14.47 | 44.47 | 39.47 | 26.97 | 29.47 | 49.47 |
| PCCD ($\eta$ = 2k) | | 100 | | 50.00 | 20.00 | 50.00 | 50.00 | 35.00 | 30.00 |
| R2 oligomer | | | 100 | 35.00 | 35.00 | 10.00 | 22.50 | 35.00 | 20.00 |
| Tg (° C.) | 143 | 70 | 119 | 93.5 | 117 | 98.6 | 95.8 | 106.1 | 113.8 |

Figure 3:
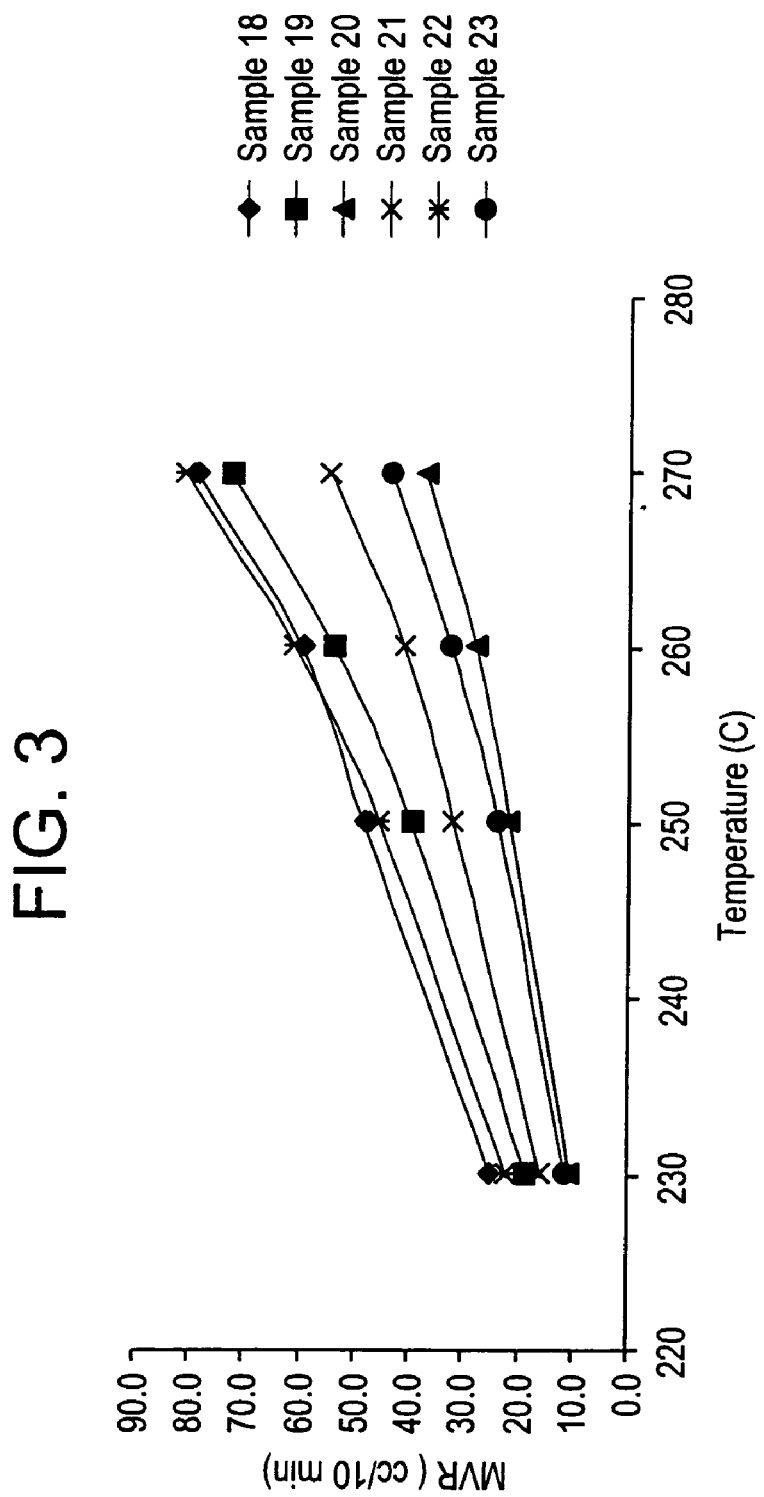
FIG. 3 is a graphical representation of the low temperature processability afforded by polycarbonate-poly(1,4-cyclohexane-dimethanol-1,4-cyclohexanedicarboxylate) blends.

The improved low temperature processability of the polycarbonate-poly(1,4-cyclohexanedimethanol-1,4-cyclohexanedicarboxylate) blends having the compositions shown in Table 7 is shown in FIG. 3. Table 7 highlights the ease of low temperature processing of the polycarbonate and polyester blends as illustrated by the low $T_g$. This property is particularly helpful in scenarios where higher processing temperature cannot be used due to processing restrictions such as in back molding on top of a highly temperature sensitive layer. One such example is back molding on top of polarizers in polarizing sunglasses application as low as 205° C.

Table 8 (a) and (b) show that low melt viscosity polycarbonates can also be used to make polymeric blends that can be processed at low temperatures similar to blends reported in Table 3 and 4 using the oligomeric polycarbonate. Formulations in Table 9 can all be processed at temperatures less than 205° C. and show the effect of percent low melt viscosity polycarbonate on the mechanical properties of the polymeric blends.

TABLE 8 (a)

| Composition | Sample #23 |
|---|---|
| Lexan ® OQ1030 PC | 49.46 |
| PCCD, 2k poise | 49.46 |
| Pentaerythritol tetrastearate | 0.30 |
| Phosphoric Acid pre-diluted to 10% | 0.23 |
| PEP-Q | 0.15 |
| Total | 100 |
| Properties | |
| Flexural Modulus in PSI | 271000 |
| Secant Modulus@2% Strain in PSI | 265000 |
| Flexural Strength in PSI | 11400 |
| Tensile Elongation@Break in % | 109.72 |
| Tensile Stress@Yield in PSI | 7390 |
| Yellowness Index | 2.8 |
| Transmission in % | 89.8 |
| Haze in % | 3 |
| HDT in ° C. | 82.2 |
| MVR at 265 C., 4 min Dwell, 2.16 kg load in cm3/10 min | 41 |
| Total Energy-Room Temp in ft-lbf (By Multi-axial Impact Test) | 34.4 |
| Impact Energy-Room Temp in ft-lbf (By Multi-axial Impact Test) | 104.5 |
| Ductility - Room Temp. in % (By Multi-axial Impact Test) | 80 |
| Total Energy at 0° C. in ft-lbf (By Multi-axial Impact Test) | 35 |
| Impact Energy at 0° C. in ft-lbf (By Multi-axial Impact Test) | 104.8 |
| Ductility at 0° C. in % (By Multi-axial Impact Test) | 80 |

TABLE 8(b)

| | Sample #24 | Sample #25 | Sample #26 |
|---|---|---|---|
| Composition | | | |
| Lexan ® OQ1020 PC | 0 | 0 | 49.66 |
| Lexan ® OQ1050 PC | 0 | 49.66 | 0 |
| Lexan ® OQ1030 PC | 49.66 | 0 | 0 |
| PCCD, 2k poise | 49.66 | 49.66 | 49.66 |
| Pentaerythritol tetrastearate | 0.300 | 0.300 | 0.300 |
| Phosphoric Acid pre-diluted to 10% | 0.225 | 0.225 | 0.225 |
| PEP-Q | 0.150 | 0.150 | 0.150 |
| Total | 100 | 100 | 100 |
| Properties | | | |
| Melt Volume Rate in cm³/10 min | 38.5 | 38.7 | 37.5 |
| Ductility - Room Temp. in % (By Multi-axial Impact Test) | 100 | 60 | 100 |
| Impact Energy-Room Temp in ft-lbf (By Multi-axial Impact Test) | 104.8 | 104.8 | 104.8 |
| Total Energy-Room Temp in ft-lbf (By Multi-axial Impact Test) | 43.3 | 33.6 | 42.1 |

TABLE 9

| | Sample #27 | Sample #28 | Sample #29 |
|---|---|---|---|
| Composition | | | |
| Lexan ® OQ 1030 PC | 39.61 | 49.6125 | 59.61 |
| PCCD, 2k poise | 59.61 | 49.6125 | 39.61 |
| Phosphoric Acid pre-diluted to 10% | 0.075 | 0.075 | 0.075 |
| Pentaerythritol tetrastearate | 0.300 | 0.300 | 0.300 |
| UV-A | 0.250 | 0.250 | 0.250 |
| PEP-Q | 0.150 | 0.150 | 0.150 |
| Total | 100 | 100 | 100 |
| Properties | | | |
| Melt Volume Rate in cm³/10 min | 37.67 | 41.000 | 39.92 |
| Flexural Modulus in PSI | 249000 | 268000 | 287000 |
| Flexural Strength in PSI | 10400 | 11400 | 12200 |
| Secant Modulus@2% Strain in PSI | 242000 | 265000 | 283000 |
| Tensile Modulus in PSI | 232000 | 250000 | 274000 |
| Tensile Elongation@ Break in % | 123.8 | 136.2 | 123.5 |
| Tensile Stress@Yield in PSI | 6870 | 7210 | 7770 |
| Ductility - Room Temp. in % (By Multi-axial Impact Test) | 60 | 100 | 100 |
| Impact Energy-Room Temp in ft-lbf (By Multi-axial Impact Test) | 104.9 | 104.8 | 104.8 |
| Total Energy-Room Temp in ft-lbf (By Multi-axial Impact Test) | 26.4 | 43.0 | 41.4 |

TABLE 9-continued

|  | Sample #27 | Sample #28 | Sample #29 |
|---|---|---|---|
| Ductility at 0° C. in % (By Multi-axial Impact Test) | 60 | 100 | 100 |
| Impact Energy at 0° C. in ft-lbf (By Multi-axial Impact Test) | 104.9 | 104.9 | 104.9 |
| Total Energy at 0° C. in ft-lbf (By Multi-axial Impact Test) | 31.8 | 46.9 | 42.7 |

From these experiments, it may be seen that the thermoplastic blends comprising polycarbonate and poly(1,4-cyclohexanedimethanol-1,4-cyclohexanedicarboxylate) have numerous advantages. These blends may be formed at low temperatures, which permit them to be used on substrates having low thermal resistance. They are also free of defects such as comets and veins, when examined in polarized light. They may therefore be advantageously used in optical applications such as optical elements, ophthalmic sheets, microscopes and the like. The methods of forming such high quality optical films and sheets advantageously permit them to be formed at birefringence retardations of either less than or equal to about 150 nm or at birefringence retardations of greater than or equal to about 350 nm. These methods permit the film to be formed without any defects upon manufacturing. In the event that a film with defects is detected, it can be corrected and used in an optical application.

In general, it can be seen from the aforementioned examples that a blend comprising polycarbonate in an amount of about 30 to about 80 wt % can produce an optical quality film having a desirable birefringence retardation of less than or equal to about 150 nm or greater than or equal to about 350 nm. It can also be seen that a blend comprising polycarbonate in an amount of about 40 to about 60 wt % can produce an optical quality film having a desirable birefringence retardation of less than or equal to about 150 nm or greater than or equal to about 350 nm. Further the formulations described in Table 8(a), 8(b) and Table 9 could be used in low temperature processing applications such as back molding on top of a film, wherein the film comprises a blend composition that is free of comets and veins and can be used in polarizers and polarized sunglasses. From the aforementioned examples, it may also be seen that an optically clear polycarbonate and polyester blend that is substantially free from veins and/or comets comprises high flow polycarbonate and a low viscosity polyester resin derived from a cycloaliphatic diol, or equivalent thereof, and a cycloaliphatic dicarboxylic acid, or an equivalent thereof, wherein the resulting blend has a $T_g$ of less than about 200° C. and an acceptable multi-axial impact strength.

Additionally the films may be utilized in layered optical application such as a protective cover for polarizers, and the like. The films and sheets because of their advantageous low temperature properties may be used in such layered applications without destroying or degrading any other components of the layered optical application that possess low thermal resistance.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of substantially eliminating comets and veins in an optical film or sheet comprising:
   annealing the film or sheet comprising a polymeric alloy to a temperature proximate to a glass transition temperature of a polymeric resin contained in the alloy.

2. The method of claim 1, wherein the annealing temperature is greater than or equal to about a highest glass transition temperature of the polymeric resins contained in the polymeric alloy.

3. The method of claim 1, wherein the annealing is conducted at a temperature of greater than or equal to about 10° C. below the lowest glass transition temperature of the alloy.

4. The method of claim 1, wherein the annealing temperature is greater than a glass transition temperature of the polymeric alloy.

5. The method of claim 1, wherein the film or sheet has a birefringence retardation of less than or equal to about 150 nm after the annealing, and wherein the optical transmissivity is greater than or equal to about 85%.

6. The method of claim 1, wherein the alloy comprises a polycarbonate-polyester blend.

7. The method of claim 6, wherein the polycarbonate-polyester blend comprises polycarbonate-poly(1,4-cyclohexane-dimethanol-1,4-cyclohexanedicarboxylate).

8. The method of claim 7, wherein the polycarbonate has a number average molecular weight of about 10,000 to about 35,000 g/mole when measured using a polystyrene standard, and wherein the poly(1,4-cyclohexane-dimethanol-1,4-cyclohexanedicarboxylate) has an intrinsic viscosity of about 0.82 to about 1.12.

9. The method of claim 1, further comprising deforming the sheet or the film at a temperature effective to impart to the sheet or film a birefringence retardation of greater than or equal to about 350 nanometers.

10. The method of claim 1, further comprising affixing the sheet or film to a substrate that is used as an optical device.

11. The method of claim 10, wherein the polymeric alloy is in the form of a film of thickness of less than or equal to about 1000 micrometers and the substrate is a polarizer in a polarizing optical sheet.

12. The method of claim 10, wherein the affixing comprises injection molding the sheet or film to the substrate to form a multilayered composite.

13. The method of claim 10, wherein the affixing comprises back molding the substrate to the alloy to form a multilayered composite.

14. The method of claim 10, wherein the affixing comprises coextruding the substrate with the sheet or film to form a multilayered composite.

15. The method of claim 1, further comprising deforming the multilayered composite to form an article.

16. The method of claim 15, wherein the deforming comprises thermoforming.

17. A composition comprising:
   a first polymeric resin in an amount of about 1 to about 99 wt %; and
   a second polymeric resin in an amount of about 1 to about 99 wt %, wherein the polymeric resins are treated with a deforming force or with an energy effective to produce a polymeric alloy having a birefringence retardation of greater than or equal to about 350 nanometers or with a birefringence retardation of less than or equal to about 150 nanometers; and wherein the composition having the birefringence retardation of less than or equal to about 150 nanometers has comets in an amount of less than or equal to about 0.25 comets/square centimeter.

18. The composition of claim 17, wherein the first and second polymeric resins are thermoplastic resins and wherein the composition has a transmissivity of greater than or equal to about 86%.

19. The composition of claim 17, wherein the first and second polymeric resins are not chemically identical and are polyethylene, polypropylene, polyamide, polyester, polyimide, polyacetal, polyacrylic, polycarbonate, polystyrene, polyamideimide, polyarylate, polyacrylate, polymethacrylate, polyurethane, polyarylsulfone, polyethersulfone, polyarylene sulfide, polyvinyl chloride, polysulfone, polyetherimide, polytetrafluoroethylene, polyetherketone, polyetheretherketone, polyarylene ether, liquid crystalline polymer, or a combination comprising at least one of the foregoing thermoplastics.

20. The composition of claim 17, wherein the polyester is polyethelene terephthalate, polybutylene terephthalate, poly(1,4-cyclohexane-dimethanol-1,4-cyclohexanedicarboxylate), poly(trimethylene terephthalate), poly(cyclohexanedimethanol-co-ethylene glycol terephthalate), a blend comprising the copolymer of 100 mole percent terephthalic acid, about 60 to about 90 mole percent 1,4-cyclohexanedimethanol and about 10 to about 40 mole percent ethylene glycol, or a blend comprising a copolymer of 100 mole percent cyclohexane dimethanol, 1 to 100 mole percent terephthalic acid and 1 to 100 mole percent isophthalic acid.

21. The composition of claim 17, wherein the first polymeric resin is a polycarbonate having a molecular weight of about 10,000 g/mole to about 65,000 g/mole as measured using a polystyrene standard and the second polymeric resin is polyester, and wherein the composition has a glass transition temperature of less than or equal to about 200° C.

22. The composition of claim 21, wherein the polyester comprises poly(1,4-cyclohexane-dimethanol-1,4-cyclohexanedicarboxylate) having an intrinsic viscosity of about 0.82 to about 1.12.

23. An optical device manufactured by the method of claim 1.

24. An film or sheet manufactured from the composition of claim 17.

25. An optical device manufactured from the composition of claim 17.

26. A method for manufacturing a film or sheet comprising:
deforming a polymeric alloy at a temperature effective to impart to the deformed alloy a birefringence retardation of greater than or equal to about 350 nanometers; and wherein the deformed polymeric alloy has comets in an amount of less than or equal to about 0.25 comets/square a cerdtimeter.

27. The method of claim 26, wherein the polymeric alloy is thermoplastic, wherein the polymeric alloy comprises a UV stabilizer and wherein the polymeric alloy comprises at least two resins.

28. The method of claim 26, wherein the polymeric alloy comprises oligomers, polymers, branched polymers, dendrimers, ionomers, copolymers, star block copolymers, graft copolymers, block copolymers, random copolymers, or a combination comprising at least one of the foregoing polymers.

29. The method of claim 26, wherein the polymeric alloy comprises a polymeric resin, and wherein the polymeric resin is polyethylene, polypropylene, polyamide, polyester, polyimide, polyacetal, polyacrylic, polycarbonate, polystyrene, polyamideimide, polyarylate, polyacrylate, polymethacrylate, polyurethane, polyarylsulfone, polyethersulfone, polyarylene sulfide, polyvinyl chloride, polysulfone, polyetherimide, polytetrafluoroethylene, polyetherketone, polyether etherketone, polyarylene ether, liquid crystalline polymer, or a combination comprising at least one of the foregoing thermoplastics resin.

30. The composition of claim 29, wherein the polyester is polyethelene terephthalate, polybutylene terephthalate, poly(1,4-cyclohexane-dimethanol-1,4-cyclohexanedicarboxylate), poly(trimethylene terephthalate), poly(cyclohexanedimethanol-co-ethylene glycol terephthalate), a blend comprising the copolymer of 100 mole percent terephthalic acid, about 1 to about 99 mole percent 1,4-cyclohexanedimethanol and about 1 to about 99 mole percent ethylene glycol, or a blend comprising a copolymer of 100 mole percent cyclohexane dimethanol, 1 to 100 mole percent terephthalic acid and 1 to 100 mole percent isophthalic acid, or a combination comprising at least one of the foregoing.

31. The method of claim 26, wherein the polymeric alloy comprises a polycarbonate-polyester blend.

32. The method of claim 31, wherein the polycarbonate-polyester blend comprises polycarbonate and poly(1,4-cyclohexane-dimethanol-1,4-cyclohexanedicarboxylate).

33. The method of claim 32, wherein the polycarbonate has a number average molecular weight of about 10,000 to about 35,000 g/mole when measured using a polystyrene standard, and wherein the poly(1,4-cyclohexane-dimethanol-1,4-cyclohexanedicarboxylate) has an intrinsic viscosity of about 0.82 to about 1.12.

34. The method of claim 26, wherein the polymeric alloy comprises polycarbonate-poly(cyclohexanedimethanol-co-ethylene glycol terephthalate), polycarbonate-polyethylene terephalate, polycarbonate-polybutylene terephthalate, polycarbonate with a blend comprising a copolymer of 100 mole percent terephthalate acid, about 1 to about 99 mole percent 1,4-cyclohexanedimethanol and about 1 to about 99 mole percent ethylene glycol, polycarbonate-copolyester-carbonate, polycarbonate-polymethylmethacrylate, polycarbonate with a blend comprising a copolymer of 100 mole percent terephthalic acid, about 1 to about 99 mole percent 1,4-cyclohexanedimethanol and about 1 to about 99 mole percent ethylene glycol, polycarbonate-poly(1,4-cyclohexanedimethanol-1,4-cyclohexanedicarboxylate)-poly (cyclohexanedimethanol-co-ethylene glycol terephthalate), polycarbonate-copolyester-carbonate with a blend comprising a copolymer of 100 mole percent terephthalic acid, about 1 to about 99 mole percent 1,4-cyclohexanedimethanol and about 1 to about 99 male percent ethylene glycol, a blend prising a copolymer of 100 mole percent cyclohexane dimethanol, 1 to 100 mole percent terephthalic acid and 1 to 100 mole percent isophthalic acid, or a combination comprising at least one of the foregoing.

35. The method of claim 26, further comprising annealing the film or sheet at at temperature effective to impart to the deformed alloy a birefringence retardation of less than or equal to about 150 nanometers.

36. The method of claim 26, wherein the deforming occurs by shear, compression or elongational forces, or a combination of any two of the foregoing forces, or all three of the foregoing forces.

37. The method of claim 26, wherein the deforming occurs in a two roll mill or a three roll mill.

38. The method of claim 26, wherein the polymeric alloy may be deformed into a film or a sheet.

39. The method of claim 26, wherein the film or sheet is used in an optical device.

40. A method for manufacturing a film or sheet comprising:
   deforming a polymeric alloy in a roll mill at a temperature effective to impart to the deformed alloy a birefringence retardation of greater than or equal to about 350 nanometers; wherein the polymeric alloy comprises a polycarbonate-polyester blend; and wherein the polycarbonate-polyester blend comprises polycarbonate and poly(1,4-cyclohexane-dimethanol-1,4-cyclohexanedicarboxylate).

41. The method of claim 40, wherein the polycarbonate has a number average olecular weight of about 10,000 to about 35,000 g/mole when measured using a polystyrene standard, and wherein the poly(1,4-cyclohexane-dimethanol-1,4-cyclohexanedicarboxylate) has an intrinsic viscosity of about 0.82 to about 1.12.

42. The method of claim 40, wherein the film or sheet is substantially free of comets or veins or both, after the deforming.

43. The method of claim 40, wherein the polycarbonate-polyester blend has a melt viscosity rate of greater than or equal to about 5 cubic centimeters/10 minutes when measured 265° C. with a load of 2.16 kilograms and a dwell time of four minutes.

44. The method of claim 40, wherein the polymeric alloy is free from UV stabilizer.

45. The method of claim 40, wherein the temperature effective to impart to the deformed alloy a birefringence retardation of greater than or equal to about 350 nanometers is a temparature below the $T_g$ of the alloy.

46. The method of claim 40, wherein the temperature effective to impart to the deformed alloy a birefringence retardation of greater than or equal to about 350 nanometers is a temperature that is less than or equal to about 20° C. below the $T_g$ of the alloy.

47. A method for manufacturing a film or sheet comprising:
   deforming a polymeric alloy in a roll mill at a temperature effective to impart to the deformed alloy a birefringence retardation of greater than or equal to about 350 nanometers; wherein the polymeric alloy comprises a polycarbonate-polyester blend; and wherein the polycarbonate-polyester blend comprises polycarbonate-poly(cyclohexanedimethanol-co-ethelene glycol terephthalate), polycarbonate-polyethylene terephthalate, polycarbonate-polybutylene terephthalate, polycarbonate with a blend comprising a copolymer of 100 mole percent terephthalic acid, about 1 to about 99 mole percent 1,4-cyclohexanedimethanol and about 1 to about 99 mole percent ethylene glycol, polycarbonate-copolyester-carbonate, polycarbonate-polymethylmethacrylate, polycarbonate with a blend comprising a copolymer of 100 mole percent terephthalic acid, about 1 to about 99 mole percent 1,4-cyclohexanedimethanol and about 1 to about 99 mole percent ethylene glycol, polycarbonate-poly(1,4-cyclohexane-dimethanol-1,4-cyclohexanedicarboxylate)-poly(cyclohexanedimethanol-co-ethelene glycol terephthalate), polycarbonate-copolyester-carbonate with a blend comprising a copolymer of 100 mole percent terephthalic acid, about 1 to about 99 mole percent 1,4-cyclohexanedimethanol and about 1 to about 99 mole percent ethylene glycol, a blend comprising a copolymer of 100 mole percent cyclohexane dimethanol, 1 to 100 mole percent terephthalic acid and 1 to 100 mole percent isophthalic acid, or a combination comprising at least one of the foregoing.

48. The method of claim 40, wherein the film or sheet is substantially free of comets or veins or both, after the deforming.

* * * * *